(12) United States Patent
Bischoff

(10) Patent No.: US 6,255,988 B1
(45) Date of Patent: Jul. 3, 2001

(54) INDUSTRIAL PROCESS FIELD INSTRUMENTATION EMPLOYING SATELLITE TRANSMITTED REFERENCE SIGNALS

(75) Inventor: Brian J. Bischoff, North Wales, PA (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/325,459

(22) Filed: Jun. 3, 1999

(51) Int. Cl.[7] .............................. G01S 5/02; H04B 7/185
(52) U.S. Cl. ........................ 342/357.09; 342/357.06; 342/357.13; 701/213
(58) Field of Search ...................... 342/357.1, 357.09, 342/357.17, 357.06, 357.13; 701/213

(56) References Cited

U.S. PATENT DOCUMENTS

| | | |
|---|---|---|
| 5,283,767 | 2/1994 | McCoy . |
| 5,311,197 * | 5/1994 | Sorden et al. .................. 342/457 |
| 5,379,224 * | 1/1995 | Brown et al. .................. 364/449 |
| 5,491,636 * | 2/1996 | Robertson et al. ............ 364/432 |
| 5,504,491 | 4/1996 | Chapman . |
| 6,002,362 | 12/1999 | Gudat . |
| 6,069,584 * | 5/2000 | Johnson .................... 342/357.09 |

OTHER PUBLICATIONS

PCT International Search Report, Oct. 5, 2000, International Application No. PCT/US 00/15297.

* cited by examiner

*Primary Examiner*—Dao Phan
(74) *Attorney, Agent, or Firm*—Anthony Miologos

(57) ABSTRACT

An industrial process field instrument is disclosed having access to the reference signals transmitted by the global positioning system (GPS) including a process sensor connected to an industrial process, a host system, and a communication network connected to the field instrument and the host system. The field instrument is operated in response to the reference signals received from the GPS system to transmit geographic location and time referenced process signals specific to the field instrument to the host system over the communication network.

16 Claims, 1 Drawing Sheet

INDUSTRIAL PROCESS FIELD INSTRUMENTATION EMPLOYING SATELLITE TRANSMITTED REFERENCE SIGNALS

BACKGROUND OF THE INVENTION

1. Field of the Invention

The present invention relates to industrial process field instrumentation, and more particularly to industrial process field instruments employing reference signals transmitted from satellites.

2. Discussion of the Related Art

It is a common problem in the controls industry to be able to interrogate and gather information from remotely located field installations which may be separated by many miles from a master or control location. In such instances, there is a common need to know precise information, such as flow rate information, pressure information, quantitative information relating to storage, etc. Most present day systems employ hard wire solutions to provide information from remote field locations to a master or control point. Telephone lines, microwave and links, and in some instances fiber optic cables have been employed for this particular purpose.

A space-based satellite system commonly referred to as the Global Positioning System (GPS) is presently in operation for transmitting to ground station receivers accurate positional and time synchronization signals. The GPS signals transmitted are detected and processed by a GPS receiver and used to derive highly accurate position, altitude, speed and direction information for use by a user. For example, aircraft and ships use GPS equipment to provide en route navigation and for airport or harbor approaches. GPS tracking systems have been used to route and monitor delivery vans and emergency vehicles. The agricultural community has utilized the system to monitor and control the application of agricultural fertilizer, pesticides and the harvesting of crops. Handheld GPS receivers are currently available for use as an accurate positional aid for hikers and hunters. Since the GPS user does not need to communicate with the satellite, it can have an unlimited number of users.

Because of the highly accurate nature of the reference signals transmitted by the GPS satellites and the need of not requiring direct communication with the GPS satellites, the integration of such technology in connection with industrial process field instrumentation exhibits advantages for providing location, time-stamped and time-synchronized information between two or more industrial process field transmitters and/or a master controller or other intermediate control points within an industrial control system.

Accordingly, it is the object of the present invention to utilize the GPS system in connection with an industrial control system whereby the location of various field instrumentation can be accurately located, as well as the conditions of such field instruments can be determined, detected and transmitted back to a master or control location and used by instrument technicians to locate instruments that may require servicing.

It is another object of the present invention to utilize GPS reference signals and derived GPS time signals from a GPS receiver with industrial process field instrumentation to provide time-stamp and time-synchronized data for measurement and diagnostic applications within an industrial control system.

SUMMARY OF THE INVENTION

In accomplishing the objects of the present invention there is provided an industrial process field instrument for reporting geographic location and time referenced signals representing a state of an industrial process specific to the field instrument to a host system over a communication network. The field instrument includes a microprocessor controller for operating the field instrument and a process sensor connected to the industrial process and to the controller. The sensor is arranged to monitor a state of the industrial process and to transmit process signals to the field instrument controller representative of the process.

The field instrument further includes a GPS receiver operatively connected to the controller. The GPS receiver receives radio wave reference signals radiated from a plurality of GPS satellites from locations remote to the field instrument and calculates and transmits to the controller location and time data derived from the reference signals received.

A communications link connects the controller to the communication network and the host system. The controller operates to transmit signals from the communications link representing the geographic location of the field instrument and time-referenced process signals representing a state of the industrial process specific to the field instrument to the host system over the communication network.

DESCRIPTION OF THE PREFERRED EMBODIMENT

Figure 2:
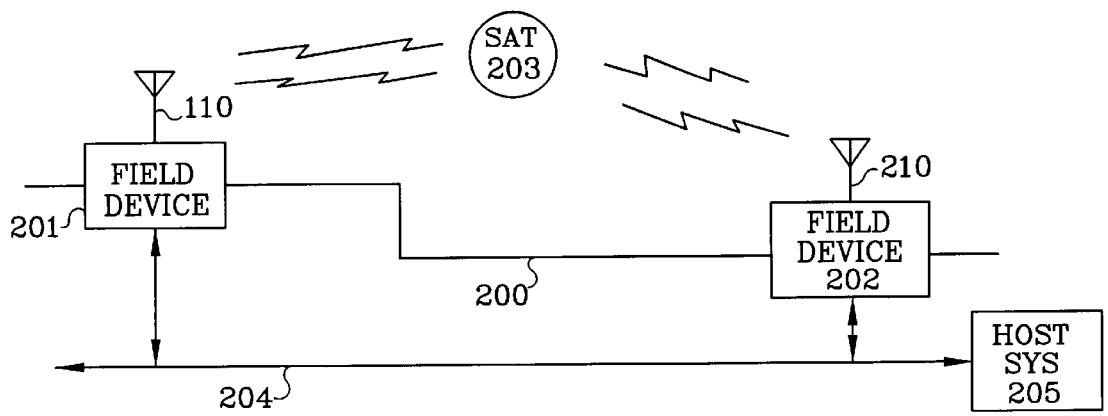
FIG. 2 shows a pipeline having two industrial process field instruments, both of which include a GPS receiver in accordance to the present invention and used to perform density measurements of the process fluid flowing in the pipeline.

It is the purpose of the present invention to utilize one or more of the satellites of the GPS system represented by satellite 203 as seen in FIG. 2, so as to derive position and time data signals from the reference signals transmitted by satellite 203 and to be used to advantage by industrial process field instrumentation, such as field instruments 201 and 202. By incorporating available information from the GPS system by field instruments, such as 201 and 202, it is possible to provide positional and time stamped and time synchronized data for location, measurement and diagnostic purposes.

Each of the GPS satellites in earth orbit radiate their respective reference signals at predetermined times. Each satellite has an atomic clock therein and transmits with a predetermined timing its own current position as a radio wave which is represented as a PN (Psuedo-Noise) code. The current position of any of the GPS satellites may be represented in terms of the spherical coordinates of a geometric system that has the center of the earth as the reference point. The PN signal transmitted is detected and processed by the GPS receiver to find the current position of the satellite whose signal was detected and to evaluate the distance between each satellite with the position of the GPS receiver by multiplying the propagation delay time for the radio wave emitted by each satellite by the velocity of light. For accurate positional information PN signals must be received from at least three satellites. A computation system within the GPS receiver derives longitude, latitude and the offset time for the GPS receiver by solving a set of three-dimensional simultaneous equations with the reference signals received. Location (latitude and longitude) is then made available for display to a user or transmitted as data to a system that uses the data to advantage.

Current and accurate time information can also be derived from the GPS reference signals by use of a local reference clock and timing circuits located in the GPS receiver. The output of the timing circuits is a GPS-derived time signal of a highly accurate nature that can be used for time-stamping or time-synchronization by systems requiring such information. The aforementioned description of a GPS system is well known by those skilled in the art and is described here as an aid in understanding the present invention.

Figure 1:
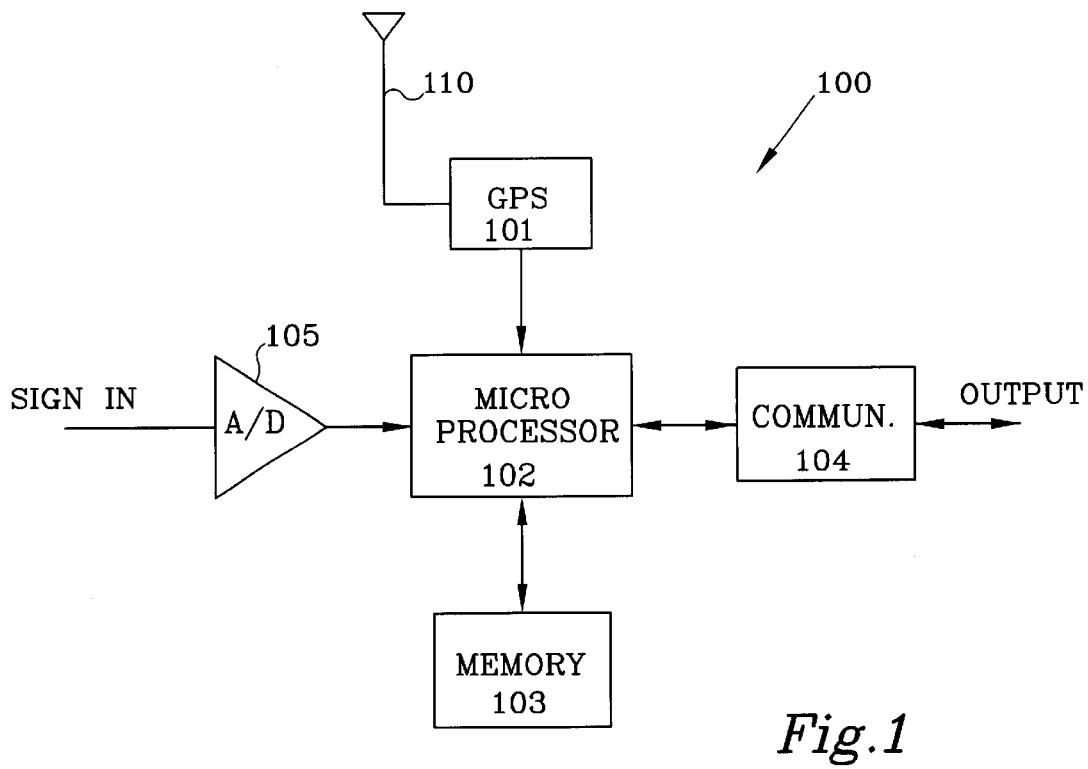
FIG. 1 is a simplified block diagram disclosing the addition of a global positioning system (GPS) receiver to the simplified instrument architecture of an industrial process field instrument, utilized in an industrial control system, in accordance to the present invention.

Referring briefly to FIG. 1, a simplified block diagram representing an industrial process field instrument including in combination a GPS receiver in accordance to the present invention is shown. The field instrument 100 is comprised of a microprocessor 102, a memory 103, an analog-to-digital converter (A/D) 105 and a communications link 104. The field instrument receives analog signals from sensor equipment (not shown) representing an observed state of a process being monitored or measured by the field instrument such as pressure, flow or temperature. The analog signals from the sensor are converted into digital process data by A/D converter 105. GPS receiver circuitry 101, connected to an omnidirectional antenna 110, is arranged to detect and derive positional and time information and data from the reference signals broadcast by the GPS satellite. The derived GPS location data (longitude and latitude) are output as digital data and stored for future use in memory 103. Additionally, process data received from A/D converter 105 is collected and time-stamped with the time of reception using the time information data output by the GPS receiver and also stored within memory 103. Microprocessor 102 is utilized to control the operation of field instrument 100, as well as to select the necessary sampling and the storing frequency for the sensor data collected in accordance to an operating program.

Microprocessor 102, in conjunction with the operating instructions of the operating program, cause the field instrument 100 to process the sensor data received from the process, and the derived GPS position and time data, into specific reporting and diagnostic messages used by a host system such as a process control system. Examples are reporting and diagnostic messages that would include: the transmission of time-stamped process value data based on the signals received from the sensor and the GPS receiver 101; the diagnostic data representing the state of the field instrument at a particular instance in time; and/or the field instrument's malfunction at a particular instance in time.

The time-stamped process or diagnostic messages and the data they contain therein is transmitted to the host system via the communication link 104 either: at predetermined times synchronized by the time derived from the GPS receiver 101; upon detection of a malfunction by the field instrument; and/or upon polling of the device by a host system. In the event of a malfunction requiring attention by a technician, location information stored in memory 103 can be transmitted to the host system and displayed to the technician as an aid in identifying and locating the malfunctioning field instrument.

Another example of using a field instrument that incorporates a GPS receiver to advantage would be related to the density measurement of a process fluid flowing in a pipeline or contained within a vessel. With reference to FIG. 2, the field instrument of the present invention is shown used for making monitoring grade density measurements within a pipeline such as 200. A monitoring grade measurement is defined as a value of measurement for an operation or a measured condition that is within a designated range of values, as opposed to a process grade density measurement that represents a precise measured value. In this example, two field devices 201 and 202, incorporating GPS receiver circuitry as outlined in FIG. 1, are installed in a section of pipe remotely from each other, as shown in FIG. 2.

Both field instruments 201 and 202 receive GPS reference signals via antennas 110, 210 respectively, from the orbiting GPS satellites such as satellite 203 shown. A GPS receiver 101 within each field device 201 or 202 records the time the signal is received and, based on the time difference in the broadcast of the GPS reference signal, calculates the position of the instruments 201 and 202. Each instrument also derives an accurate and synchronized time reference from the GPS reference signal. The position and time are provided to an associated microprocessor such as 102 within each field instrument.

The field instruments 201 and 202 each also receives a pressure signal that is derived from a piezoresistive sensor element (not shown) mounted on the pipeline 200 and in contact with the process fluid flowing therein. The pressure signal applied on the signal input of the high resolution A/D converter 105 is also input into microprocessor 102. Sufficient low power random access memory (RAM) and read only memories (ROM) which may be included in memory 103 are provided within each field device 201 and 202 to store data and the operating program for the field instrument's operation.

As seen in FIG. 2, both field instruments 201 and 202 are able to communicate with each other and to a host system 205 via a communication network 204 that interconnects the field instruments 201 and 202 to the host system 205. The host system could be the main controller of a process controller system or a local controller of a distributed process control system. Field device 201 is configured to broadcast time-stamped pressure and position information to field device 202 and to host system 205. Field instrument 202 is configured to receive the time-stamped pressure and position information from field instrument 201 and the time-stamped pressure and position information it derives from its own GPS receiver 101 and perform the following density measurement calculation:

$$p(t1)=(P2(t1)-P1(t1)/(Z1(t1)-Z2(t1))*g$$

where:
  $p(t1)$=density at time t1
  $P2(t1)$=pressure measured for field instrument 202 at time t1
  $P1(t1)$=pressure measured for field instrument 201 at time t1
  $Z1(t1)$=position of field instrument 201 at time t1 =p1
  $Z2(t1)$=position of field instrument 202 at time t1
  g=gravitational constant At this point, field device 202 transmits the time-stamped pressure from field device 202 and calculated density measurement to the host system 205 for control and monitoring purposes. The monitoring grade density measurement so derived is utilized by the host system 205 for diagnostic purposes and by other instrumentation connected to and utilized by the host system 200.

For example, a Coriolis meter (not shown) can be installed on pipeline 200 to measure density of the process fluid flowing in the pipeline. A signal representing the density measured by the Coriolis meter is transmitted on communications network 204 to the host system 205. The host system compares the calculated density measurement from the field device 202 and the Coriolis meter density measurement and, based on the foregoing comparison, an alert diagnostic message could be issued via the host system 205 to a local operator when the difference between the two measurements exceeds an uncertainty threshold for the instruments.

Since the GPS reference signals transmitted by the spaced-based satellites of a GPS system is a high frequency microwave signal (at 1575.42 MHz), it suffers a susceptibility to interference and a reduction in signal strength from solid or other structures. Field Instruments located within buildings and near other structures such as holding tanks, cooling towers and other framework found within a modern industrial process plant may cause interference with the clear reception of the space based GPS reference signal. For this occurrence it is contemplated that in order to provide a clear signal to the GPS receiver installed in the field instrument, pseudo-satellite transmission facilities can be set up in areas of potentially poor reception. These pseudo-satellite transmission facilities would consist of an omnidirectional antenna with an unobstructed line of sight path to the GPS satellite. The GPS signal received by the antenna would be coupled into a transmission line and broadcast from a transmission antenna near or in the vicinity of the GPS receiver equipped field instrument. The pseudo-satellite transmission facility just described could also be effectively used to transmit a GPS reference signal within a building to field instruments located therein.

It will be well understood by those skilled in this art that other advantageous uses of the field instrument 100 incorporating in combination a GPS receiver 102 as taught by the present invention can be made and used to advantage in an industrial process field instrument within an industrial control system and the present invention is not limited thereto.

Additionally, the present invention has been described in terms of the presently preferred embodiments. It is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A field instrument for reporting the geographic location and time referenced signals representing a state of an industrial process to a host system over a communication network comprising:
   a) controller means for operating said field instrument;
   b) sensor means connected to said industrial process and to said controller means for sensing a state of industrial process and transmitting process signals to said field instrument representative of said state;
   c) receiving means connected to said controller means for receiving radio wave reference signals radiated from a plurality of locations remote to said field instrument and for calculating and transmitting to said controller means location and time data derived from said plurality of reference signals, said controller means referencing said process signals with instances of time from said time data; and
   d) communications means connecting said controller means to said communication network whereby said field instrument operates to transmit signals representing the geographic location of said field instrument and time referenced process signals representing a state of the industrial process specific to said field instrument to said host system over said communication network.

2. The field instrument as claimed in claim 1 wherein said field instrument further includes:
   memory means connected to said controller means for storing said process signals representative of said state of industrial process and said location and time data derived by said receiving means, said controller means storing said process signals in said memory means with reference to the time data received from said receiving means, and said controller means is further operable to transfer said location data and said time referenced process signals to said communication means for the transmission of said signals representing the geographic location of said field instrument and said time referenced process signals representing a state of the industrial process specific to said field instrument to said host system over said communication network.

3. The field instrument as claimed in claim 2 wherein said receiving means is a global positioning system (GPS) receiver.

4. The field instrument as claimed in claim 3 wherein said radio wave reference signals are radiated from a plurality of GPS satellites.

5. The field instrument as claimed in claim 4 wherein said radio wave reference signals are radiated from a plurality of pseudo-satellite transmission facilities, each pseudo-satellite transmission facility arranged to receive said radio wave reference signals from a respective one of said GPS satellites and to re-transmit said radio wave reference signals received in the vicinity of said field instrument.

6. The field instrument as claimed in claim 4 wherein said time referenced process signals transmitted to said host system are utilized for diagnostic purposes relating to the operation of said field instrument.

7. The field instrument as claimed in claim 4 wherein said time referenced process signals transmitted to said host system are utilized by said host system to control the operation of said industrial process.

8. A field instrument for reporting time referenced signals representing a state of an industrial process over a communication network comprising:
   a) controller means for operating said field instrument;
   b) sensor means connected to said industrial process and to said controller means for sensing a state of industrial process and transmitting process signals to said field instrument representative of said state;
   c) receiving means connected to said controller means for receiving radio wave reference signals radiated from a plurality of locations remote to said field instrument and for calculating and transmitting to said controller means time data derived from said plurality of reference signals, said controller means referencing said process signals with instances of time from said time data; and
   d) communications means connecting said controller means to said communication network whereby said field instrument operates to transmit time referenced process signals representing a state of industrial process specific to said field instrument over said communication network.

9. The field instrument as claimed in claim 8 wherein said field instrument further includes:

memory means connected to said controller means for storing said process signals representative of said state of industrial process and said time data derived by said receiving means, said controller means storing said process signals in said memory means with reference to the time data received from said receiving means, and said controller means is further operable to transfer the time referenced process signals to said communication means for the transmission of said time referenced process signals representing the state of the industrial process specific to said field instrument over said communication network.

10. The field instrument as claimed in claim 9 wherein said receiving means is a global positioning system (GPS) receiver.

11. The field instrument as claimed in claim 10 wherein said radio wave reference signals are radiated from a plurality of GPS satellites.

12. The field instrument as claimed in claim 11 wherein said radio wave reference signals are radiated from a plurality of pseudo-satellite transmission facilities, each pseudo-satellite transmission facility arranged to receive said radio wave reference signals from a respective one of said GPS satellites and to re-transmit said radio wave reference signals received in the vicinity of said field instrument.

13. The field instrument as claimed in claim 11 wherein there is further included a host system connected to said communication network and said field instrument transmits said time referenced process signals representing a state of the industrial process specific to said field instrument over said communication network to said host system.

14. The field instrument as claimed in claim 13 wherein there is further included at least a second field instrument for reporting time referenced signals representing a state of an industrial process connected at a different location to said industrial process and to said host system via said communication network, said second field instrument arranged to receive said time referenced process signals transmitted by said field instrument over said communication network and said second field instrument operable to compare the time referenced process signals representing a state of industrial process specific to said second field instrument with said time referenced process signals representing a state of industrial process received from said field instrument and to transmit information based on said comparison to said host system via said communication network.

15. The field instrument as claimed in claim 14 wherein said information transmission from said second field instrument is utilized for diagnostic purposes relating to deviations from an established condition of industrial process.

16. The field instrument as claimed in claim 14 wherein said information transmission from said second field instrument is utilized by said host system to control the operation of said industrial process.

* * * * *